Feb. 20, 1923.
G. MACLOSKIE,
SAFETY CAR CONTROL AND AIR BRAKE EQUIPMENT,
FILED JULY 7, 1921.
1,445,902.
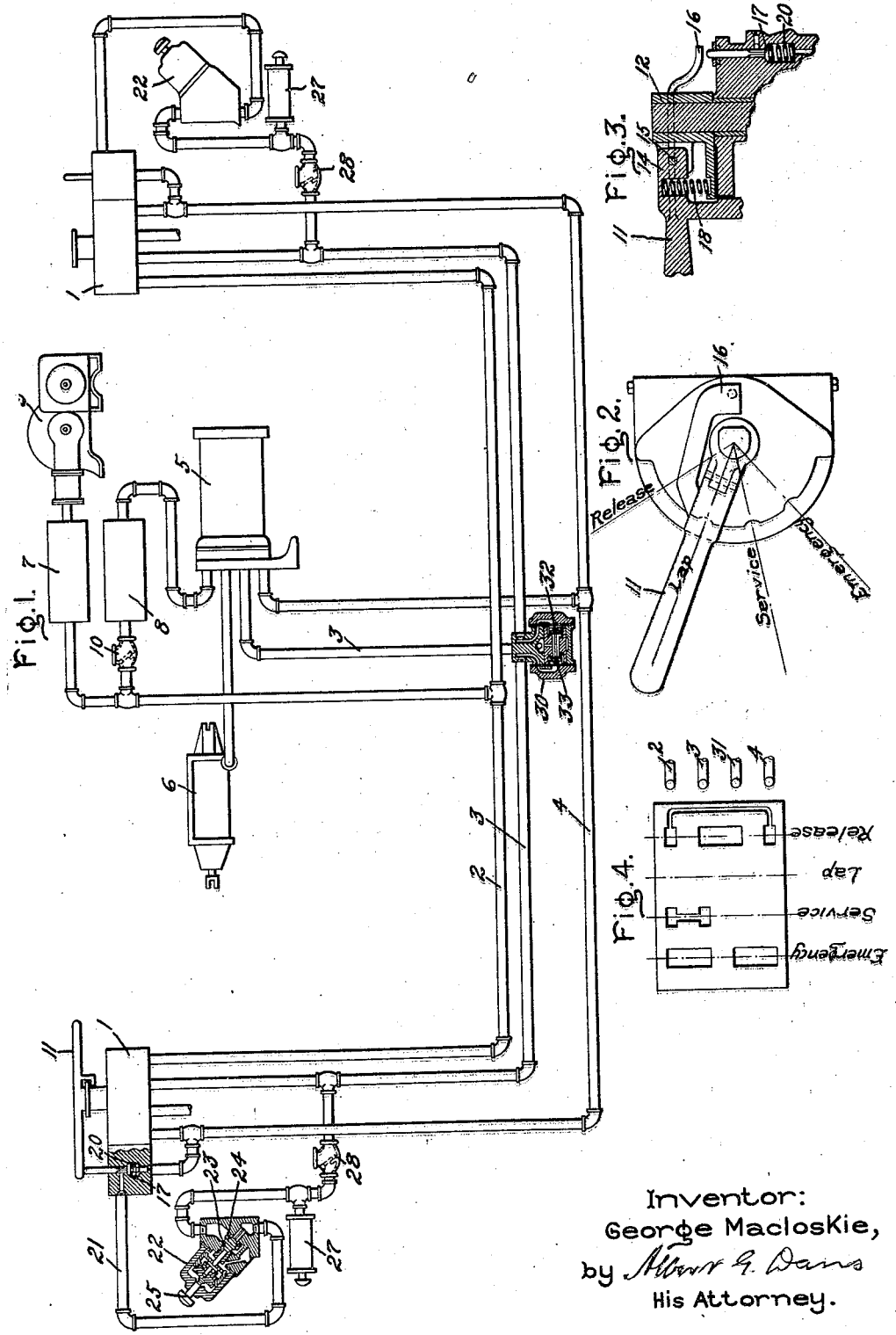
Inventor:
George Macloskie,
by Albert G. Davis
His Attorney.

Patented Feb. 20, 1923.

1,445,902

UNITED STATES PATENT OFFICE.

GEORGE MACLOSKIE, OF ERIE, PENNSYLVANIA, ASSIGNOR TO GENERAL ELECTRIC COMPANY, A CORPORATION OF NEW YORK.

SAFETY CAR CONTROL AND AIR-BRAKE EQUIPMENT.

Application filed July 7, 1921. Serial No. 483,092.

*To all whom it may concern:*

Be it known that I, GEORGE MACLOSKIE, a citizen of the United States, residing at Erie, county of Erie, State of Pennsylvania, have invented certain new and useful Improvements in Safety Car Control and Air-Brake Equipments, of which the following is a specification.

My invention relates to safety car control and air brake equipments.

One object of my invention is to provide a new and improved arrangement of apparatus whereby the piping required for the safety control features of the equipment is much less than is required in any of the equipments now in use, thereby effecting a material saving in the cost of the equipment.

Another object of my invention is to provide improved means for effecting an application of the brakes when the motorman releases one of his control handles.

Another object of my invention is to provide improved means for cutting off the power to the car motors when the motorman releases one of his control handles.

Another object of my invention is to provide improved means whereby the motorman may release his control handle without producing an application of the brakes and without cutting off the power to the car motors.

Another object of my invention is to provide an arrangement whereby the brakes are applied and power to the car motors is cut off when the motorman releases the handle of his brake valve in certain of its positions.

My invention will be better understood from the following description taken in connection with the accompanying drawing, and its scope will be pointed out in the appended claims.

In the accompanying drawing, Fig. 1 is a diagrammatic view partly in section of a safety car control and air brake equipment for a double-end car embodying my invention; Fig. 2 is a plan view of a motorman's brake valve which may be used; Fig. 3 is a sectional view of the motorman's brake valve shown in Fig. 2; and Fig. 4 is a diagrammatic development of the motorman's valve shown in Fig. 2.

As shown in Fig. 1 of the drawing, the air brake equipment comprises a motorman's brake valve 1 at each end of the car, a main reservoir pipe 2, a straight air pipe 3, an emergency pipe 4, an emergency valve 5, a brake cylinder 6 and two main reservoirs 7 and 8 supplied from an air compressor 9 and connected together by means of a one-way check valve 10 so that fluid can flow only from the main reservoir 7 to the main reservoir 8. The main reservoir 7 is connected directly to the main reservoir pipe 2 and the main reservoir 8 is connected to the emergency valve 5. The above apparatus is standard for emergency straight air brake equipments and is well known in the art and therefore a complete description thereof is deemed unnecessary.

At each end of the car means are provided for venting fluid from the emergency pipe 4 when the motorman releases one of his operating handles. In the equipment shown fluid is adapted to be vented from the emergency pipe by the motorman releasing the handle of his brake valve.

Each motorman's brake valve 1 is adapted to be operated by a removable handle 11. As shown in Fig. 3, the handle consists of two parts, the body portion 12 which fits over the stem of the brake valve and the handle portion 14 which is pivoted to the body portion at 15 and which is provided with an arm 16 adapted to be moved into engagement with the stem of a pilot valve 17 when the motorman releases the brake valve handle in certain of its positions. The arm 16 is held out of engagement with the stem of the pilot valve 17 by the motorman pressing the handle 14 downwardly against the spring 18. As shown in Fig 2. of the drawing, the arm 16 is shaped so that it only engages the stem of the pilot valve 17 when the handle is released in the lap and release positions of the motorman's brake valve. The pilot valve 17 is normally held in its closed position by the spring 20. When the pilot valve 17 is open communication is established between the emergency pipe 4 and the straight air pipe 3 through the pipe 21. A manually controlled cut off valve device 22 is interposed in the pipe 21 at a convenient place for operation by the motorman's foot. This valve device comprises a casing containing a valve 23 adapted to be held off of its seat normally by a spring 24 so as to establish communication through the pipe 21 and having a stem adapted to be engaged by a foot pedal 25 so that the valve 23 is seated and the communication through the pipe 21 is cut off upon the foot pressure being applied to the foot pedal 25.

In order to cut off the power to the car motors when the brakes are applied by the motorman releasing the handle of the motorman's valve, I connect a circuit breaker operating device 27 to the pipe 21 at each end of the car. Each circuit breaker operating device is arranged so that it opens a circuit breaker (not shown) in the motor circuit breaker whenever fluid under pressure is supplied thereto. In order to prevent the circuit breakers being opened when a straight air application of the brakes is made, a one-way check valve 28 is connected in each pipe 21 between the circuit-breaker operating device 27 and the straight air pipe 3 and is so arranged that fluid can only flow through the pipe 21 from the emergency pipe 4 to the straight air pipe 3. In order to cut off the control of the air brakes from the non-operating end of the car, a double check valve 30 is provided in the straight air pipe 3. This double check valve is of the type well known in the art as a back acting check valve, and, as shown, it comprises two valves 32 and 33 which are connected together so that when one is seated the other is unseated.

The operation of the equipment shown is as follows: Let it be assumed that the check valve 30 is in the position shown in the drawing; that the car is being operated from the end where the motorman's valve, shown on the left hand side of the drawing, is situated and that this motorman's valve is in its release position. At the non-operating end of the car, the motorman's valve is in the service position, which is the handle-off-position. Under these conditions the portion of the straight air pipe 3 which extends from the check valve 30 to the motorman's valve at the non-operating end of the car is supplied with fluid under pressure from the main reservoir pipe 2, and the portion of the straight air pipe 3 which extends to the motorman's valve at the operating end of the car is connected to atmosphere. Consequently the pressure in the portion of the straight air pipe 3, which extends to the non-operating end of the car, maintains the valve 32 of the check valve 30 seated, and the valve 33 off of its seat, so that communication is established between the portion of the straight air pipe 3 which extends to the motorman's brake valve at the operating end of the car and the portion of the straight air pipe which extends to the emergency valve 5.

If the motorman desires to make a service application of the brakes, he moves the motorman's valve at the operating end to the service position. In this position of the motorman's valve, the portion of the straight air pipe which extends to the operating end is connected to the main reservoir pipe so that fluid under pressure is supplied through the emergency valve 5 to the brake cylinder 6. The check valve 28 at the operating end of the car prevents fluid from being supplied to the circuit breaker operating device 27. The brakes are released after a service application by moving the motorman's valve at the operating end to the release position, in which position the straight air pipe is connected to atmosphere.

If the motorman desires to make an emergency application of the brakes, he moves the motorman's valve at the operating end to the emergency position. In this position, the emergency pipe 4 is connected to atmosphere thereby effecting the operation of the emergency valve in a well known manner to establish communication between the main reservoir 8 and the brake cylinder 6. The brakes are released after an emergency application of the brakes by moving the motorman's valve to the release position, in which position the emergency pipe 4 is connected to the main reservoir pipe 2 thru a restricted passage. As soon as the pressure in the emergency pipe is restored, the emergency valve 5 operates in the well known manner to connect the brake cylinder 6 to the straight air pipe 3, which at this time is connected to atmosphere through the motorman's valve at the operating end of the car.

While running, the motorman maintains the brake valve handle 11 depressed so that the arm 16 does not engage the stem of the pilot valve 17. If, however, he releases the handle in either the lap or release position, the handle moves up and the arm 16 engages the stem of the valve 17 so that the valve is opened and fluid under pressure is vented from the emergency pipe 4 through the pipe 21 to the circuit breaker operating device and to the straight air pipe 3. The passage thru which fluid is vented is so much larger than the restricted passage in the brake valve thru which fluid is supplied from the main reservoir pipe to the emergency pipe in the release position of the brake valve that the pressure in the emergency pipe is reduced. The reduction in the emergency pipe pressure causes an emergency application of the brakes in a manner well known in the art. The venting of fluid to the circuit breaker operating device 27 actuates the piston thereof to open the circuit breaker controlled thereby, thus cutting off the power to the car motors.

The brakes may be released by depressing the handle of the brake valve and moving the brake valve into its release position, if it is not already in that position. As soon as the brake valve handle is depressed the spring 20 closes the valve 17 thereby cutting off communication between the emergency pipe 4 and the pipe 21 so that, with the motorman's valve in its release position, the pressure in the emergency pipe builds up and restores the emergency valve 5 to its normal position, in which position the brake cylinder 6 is connected to the straight air pipe 3.

While running, the motorman may release the handle 11 without effecting an application of the brakes, if he first depresses the pedal 25 of the foot valve 22. The movement of the pedal moves the valve 33 onto its seat to cut off communication through the pipe 21 so that not enough air is vented from the emergency pipe 4 when the valve 17 is opened to open the motor circuit or to effect an emergency application of the brakes.

If the motorman desires to operate the car from the opposite end he first moves the motorman's brake valve at the operating end to the service position which is the handle-off-position. Since the arm 16 is so arranged that the pilot valve 17 is not opened when the motorman's valve handle is released in the service position, it is evident that when the handle is removed in this position, fluid is not supplied to the circuit breaker operating device 27 to effect the opening of the circuit breaker controlled thereby. When the motorman reaches the opposite end of the car he applies the motorman's valve handle, then depresses it and turns the motorman's valve to the release position. In this position, fluid under pressure is released from the portion of the straight air pipe which extends to this brake valve so that the fluid pressure now acting on the valve 33 of the double check valve 30 causes the valve to close and the valve 32 to open. Fluid is then released from the brake cylinder through the straight air pipe and the valve 32 so that the air brakes may be controlled by the motorman's valve and safety control equipment at the new operating end.

While I have shown and described one embodiment of my invention I do not desire to be limited to this specific arrangement, but seek to cover in the appended claims all those modifications which fall within the true spirit and scope of my invention.

What I claim as new and desire to secure by Letters Patent of the United States, is:—

1. In a safety car control and air brake equipment, the combination with an emergency pipe, a straight air pipe, a manually controlled handle, and a circuit breaker operating device arranged to control the circuit of the car motors, of a valve device arranged to be actuated by the release of said handle to establish communication between said emergency pipe and said circuit breaker operating device and between said emergency pipe and straight air pipe to effect an emergency application of the breaker and the interruption of the circuit of the car motors.

2. In a safety car control and air brake equipment, the combination with an emergency pipe, a straight air pipe, a manually controlled handle, and a circuit breaker operating device arranged to control the circuit of the car motors, of a valve device arranged to be actuated by the release of said handle to establish communication between said emergency pipe and said circuit breaker operating device and between said emergency pipe and straight air pipe to effect an emergency application of the breaker and the interruption of the circuit of the car motors, and a check valve in said communication between said emergency pipe and straight air pipe and arranged to permit fluid to flow only from said emergency pipe to said straight air pipe.

3. In a safety car control and air brake equipment, the combination with an emergency pipe, a straight air pipe, a manually controlled handle, and a circuit breaker operating device arranged to control the circuit of the car motors, of a valve device arranged to be actuated by the release of said handle to establish communication between said emergency pipe and said circuit breaker operating device and between said emergency pipe and straight air pipe to effect an emergency application of the breaker and the interruption of the circuit of the car motors, and a foot valve for controlling the communication between said emergency pipe and said straight air pipe and circuit breaker operating device.

4. In a safety car control and air brake equipment, the combination with an emergency pipe, a manually controlled handle, and a circuit breaker operating device arranged to control the circuit of the car motors, of a valve device arranged to be actuated by the release of said handle to establish communication between said emergency pipe and said circuit breaker operating device, and a foot valve for controlling the communication between said emergency pipe and said circuit breaker operating device.

5. In a safety car control and air brake equipment, the combination with an emergency pipe, a straight air pipe, a manually operated handle, of a valve device arranged to be actuated by the release of said handle to vent fluid from said emergency pipe, and a foot valve for controlling said communication through which fluid is vented from said emergency pipe.

6. In a safety car control and air brake equipment, the combination with an emergency pipe, a manually controlled handle, and a circuit breaker operating device arranged to control the circuit of the car motors, of a valve device arranged to be actuated by the release of said handle to establish communication between said emergency pipe and said circuit breaker operating device, and a manually controlled valve for controlling the communication between said emergency pipe and said circuit breaker operating device established by said valve device.

In witness whereof I have hereunto set my hand this 27th day of June, 1921.

GEORGE MACLOSKIE.